Oct. 16, 1956        G. E. HENNING        2,766,481

METHODS OF AND APPARATUS FOR EXTRUDING CELLULAR PLASTICS

Filed Aug. 28, 1952

INVENTOR
G. E. HENNING
BY
ATTORNEY

United States Patent Office 2,766,481
Patented Oct. 16, 1956

2,766,481

METHODS OF AND APPARATUS FOR EXTRUDING CELLULAR PLASTICS

George E. Henning, Baltimore, Md., assignor to Western Electric Company, Incorporated, New York, N. Y., a corporation of New York Application August 28, 1952, Serial No. 306,821

12 Claims. (Cl. 18—13)

This invention relates to methods of and apparatus for extruding plastics, and more particularly to methods of and apparatus for extruding uniform coverings of cellular plastics upon filamentary conductors.

The extruders used commercially to form insulating plastic coverings upon filamentary conductive cores are of the cross-head type. Such extruders include a stock screw rotatably mounted within a cylindrical bore for forcing a plastic compound from an entrance end of the bore to a delivery end thereof, and means for advancing a filamentary conductor through a head mounted at the delivery end of the bore. The head is provided with an extrusion die mounted in axial alignment with and spaced from a core tube for guiding the advancing conductor into and through the die.

Extruders of the cross-head type inherently present the problem of compensating for unbalanced flow conditions caused by the 90° bend in the flow of the plastic compound. This unbalanced flow frequently causes a lack of concentricity between the sheath and the core of the extruded product. The obvious result of a lack of concentricity is a variation in the wall thickness of the insulation on the conductor. Since rigid specifications established for the communications industry require the physical and electrical characteristics at all points along an insulated conductor to be uniform within narrow limits of tolerance, the concentricity of the insulated conductor must be closely controlled.

The existence of unbalanced flow conditions within an extruder creates even greater problems when the plastic insulation extruded onto the conductor is cellular in nature. In the manufacture of conductors insulated by a cellular form of a plastic, such as cellular polyethylene, solid polymers of ethylene mixed with a heat decomposable blowing agent may be continuously extruded onto a conductor moving through an extrusion die. The extrusion temperature should be so controlled that as the tubular sheath of polyethylene issues from the die, the gas evolved by heat-decomposition of the blowing agent expands the sheath into a cellular form containing a multiplicity of minute, blown cells uniformly distributed throughout the sheath.

In order to prevent premature gas expansion within the confines of the extruder, it is important that temperatures within the extruder and the die should be accurately regulated and that the rate of extrusion and the linear speed of the conductive core be adjusted suitably. Furthermore, some blowing agents decompose within a rather narrow temperature range, and their decomposition temperature may be affected by the presence of other ingredients in the plastic compound. Under such circumstances, it is necessary to seek suitable means for rendering the extrusion of expanded plastics less critical with respect to temperature and ingredients. This may be accomplished by creating a back pressure within the extruder to prevent premature expansion of the gas therein and by varying the size of the aperture through which the plastic passes into the opening in the extruding die.

An object of the invention is to provide new and improved methods of and apparatus for extruding plastics.

Another object of the invention is to provide new and improved methods of and apparatus for extruding uniform coverings of cellular plastics upon filamentary conductors.

A method illustrating certain features of the invention may include advancing through an extrusion die a plastic compound having an expanding agent therein, and creating a high pressure in the advancing compound to prevent expansion thereof before it emerges from the die.

An apparatus illustrating certain features of the invention may include an extrusion head having a passageway extending therethrough, an extrusion die mounted at one end of the passageway, a core tube mounted in the passageway in axial alignment with and spaced closely from the die, means for restricting the flow of plastic compound between the core tube and the die to create a back pressure within the passageway, and means for forcing such a plastic compound through the passageway, the flow-restricting means and the die.

A clear understanding of the invention may be obtained from the following detailed description in conjunction with the accompanying drawing, in which.

Figure 1:
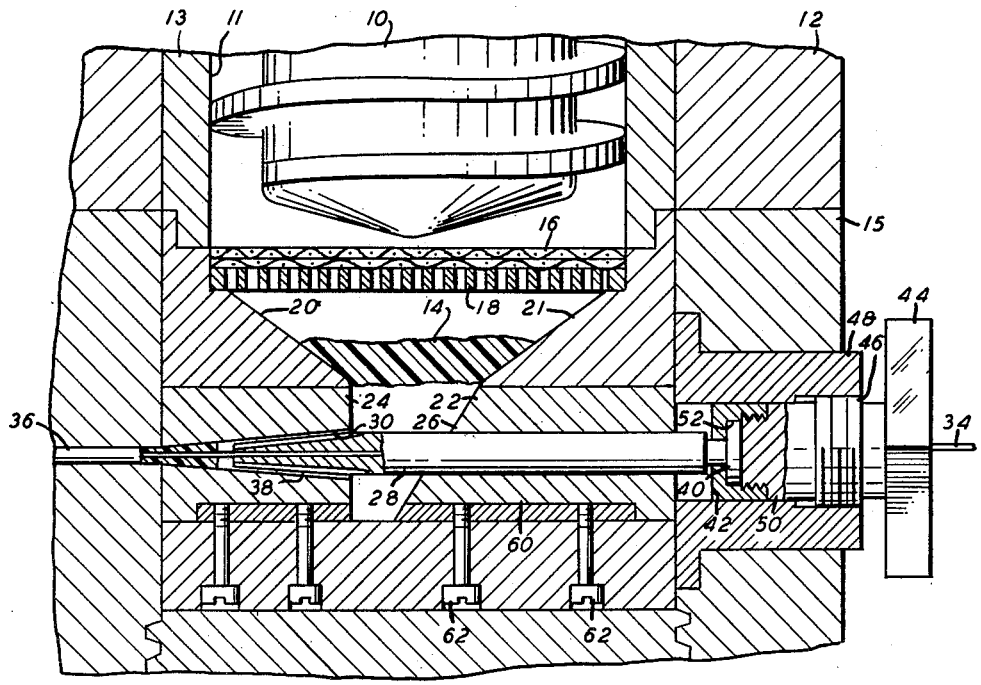
Fig. 1 is a fragmentary, horizontal section of apparatus forming one embodiment of the invention designed to be utilized in performing a method embodying the invention.

The extruder illustrated in Fig. 1 is of the cross-head type, modified in accordance with the invention. It includes a stock screw 10 disposed longitudinally for rotation within a cylindrical bore 11 of an extrusion cylinder 12 having a liner 13. Means (not shown) is provided for positively rotating the stock screw to knead and advance a mass 14 of a plastic compound toward a delivery end of the extrusion bore 11, where an extrusion head 15 is secured. The plastic compound fed into the bore 11 may be a mixture of granular polyethylene and a heat-decomposable blowing agent, such as dinitroso pentamethylene tetramine.

A straining screen 16 supported upon a backing plate 18 is mounted transversely across the delivery end of the extrusion bore 11. The screen 16 functions to strain out any lumps or foreign particles in the compound, and it also serves to knead the compound further. After passing through the straining screen 16 and the backing plate 18, the mass 14 of the plastic compound enters a tapered passageway 20 formed in a cylindrical, centrally apertured block 21. The passageway 20 diminishes gradually in cross-section as it leads from the extrusion bore 11 to a chamber 22 formed internally of the block 21. An extrusion die 24 is mounted at the left hand end of the chamber 22, as viewed in Fig. 1, and a core tube holder 26 is mounted at the right hand end thereof.

Figure 2:
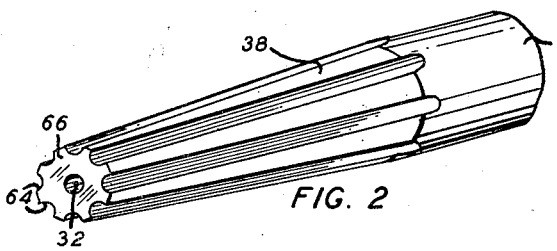
Fig. 2 is an enlarged perspective view of a portion of the apparatus shown in Fig. 1.

A core tube 28 is mounted in the holder 26 in axial alignment with a central aperture 30 which extends through the die 24. The core tube 28 is provided with an axial passageway 32 (Fig. 2) through which a filamentary conductive core 34, such as a copper-clad steel wire, may be advanced continuously, from right to left as viewed in Fig. 1. The core tube 28 guides the continuously advancing core 34 so that it will pass through the axial center of the aperture 30 in the die 24. Because of the die 24, the mass 14 of plastic compound is formed into a tubular sheath surrounding the advancing core 34, resulting in an insulated conductor 36. Beyond the die 24, the insulated conductor 36 is advanced through cooling means (not shown) and thence about a capstan (not shown) which provides the pulling force needed to advance the core 34 through the extruder.

The core tube 28 protrudes beyond the core tube holder 26 and extends through the chamber 22. A frustoconical tip 38 of the core tube 28 protrudes into the central aperture 30 in the die 24. It is to be observed that the aperture 30 in the die 24 is conical in configuration, and that it diminishes gradually in cross-section towards the exit end of the die. The conical configuration of the aperture 30 matches the configuration of the frustoconical tip 38 of the core tube 28. The core tube may be adjusted longitudinally with respect to the die 24, between a position in which the frustoconical tip 38 fits snugly within the aperture 30 and a position in which this tip is spaced uniformly about its periphery from the surrounding wall of the aperture.

In order to provide for the longitudinal adjustment of the core tube 28, the end of the core tube opposite its frustoconical tip 38 is provided with a circular head 40 which is freely rotatable within a collar 42. A nut 44 is provided with a threaded portion 46 in engagement with a correspondingly threaded bushing 48 mounted within the extrusion head 15. A protruding portion 50 of the nut 44 is treaded oppositely to the threaded portion 46 thereof and the portion 50 engages the collar 42 so as to form a cavity 52 within which the circular head 40 of the core tube 28 may rotate. By this arrangement, the nut 44 may be rotated to adjust the core tube 28 longitudinally without causing the core tube to rotate with respect to the die 24. The die 24 is generally cylindrical in shape and the flat face of its entrance end is shown in Fig. 1 to be nearly flush with the exit end of the tapered passageway 20 at the point where this passageway leads into the chamber 22. However, in some instances it may be preferred to make the die 24 relatively shorter. In such cases, the chamber 22 would be correspondingly larger, and the flat face of the entrance end of the die 24 might then appear considerably to the left of the exit end of the passageway 20.

The core tube holder 26 is provided with a flattened surface 60 on its exterior periphery which is engaged by a pair of bolts 62—62 which retain the core tube holder against rotation. The face of the core tube holder 26 that forms one boundary of the chamber 22 is shown in Fig. 1 to be inclined with respect to the flat face of the entrance end of the die 24 positioned at the opposite end of the chamber 22. The inclined end face of the core tube holder 26 causes the movement of the mass 14 of plastic compound to be directed towards the die 24, and this effect occurs primarily in the portion of the chamber 22 that is most distant from the stock screw 10. However, it may be found unnecessary to have this end face of the core tube holder 26 inclined to the extent illustrated in Fig. 1, and it may be acceptable to have this end face more nearly parallel the end face of the entrance end of the die 24.

An important feature of the invention is the provision of longitudinal grooves 64—64 equally spaced about the frustoconical tip 38 of the core tube 28. When the nut 44 is rotated to thrust the frustoconical tip 38 snugly against the matching conical wall of the aperture 30 in the die 24, the flow of the mass 14 of plastic compound through the die 24 is limited to that which can get through the grooves 64—64. Whereas, when the core tube 28 is backed slightly away from the die 24, the plastic compound may flow through a conical aperture formed by the clearance between the frustoconical tip 38 and the surrounding wall of the aperture 30 in the die. If the speed of rotation of the stock screw 10 remains the same and the core tube 28 is advanced close to the die 24 to throttle the flow of the plastic compound, it is evident that a considerable back pressure will be built up within the confines of the extrusion head 15 and the extrusion cylinder 12. The back pressure built up in this manner contributes greatly to the successful extrusion of cellular plastic compounds.

In the extrusion of a sheath of cellular polyethylene upon a filamentary conductive core, a blowing agent, such as a powdered form of dinitroso pentamethylene tetramine, may be uniformly distributed upon granules of the commercially available polymers of ethylene which are to be extruded. At the die a temperature of about 385° F. to about 450° F. is maintained to facilitate continuous extrusion of the polymer and to insure the formation of gas by decomposition of the blowing agent. A convenient length of the moving core may be preheated prior to its entry into the extruder, in order to prevent the conductive core from chilling the extruded mass and thereby inhibiting the action of the blowing agent. The extruded layer of insulation expands after leaving the extrusion die, due to gases produced by the decomposition of the blowing agent, which form minute, uniformly distributed, discrete, gas filled cells throughout the polyethylene sheath. The extruded product formed in this manner is characterized by uniformity in size, composition and electrical properties.

Other blowing agents, such as diazoamino benzene, may be substituted for the dinitroso pentamethylene tetramine specified in the foregoing description. Dinitroso pentamethylene tetramine, the preferred blowing agent, decomposes within a narrow temperature range near 400° F. This decomposition temperature is sufficiently far above the temperature at which the preferred polymers of ethylene soften to make it possible to use this blowing agent without danger of premature decomposition under ordinary operating conditions. However, the presence of other ingredients, such as certain pigments, in the plastic compound may cause this blowing agent to decompose at slightly different temperatures. In order to insure against premature expansion of the gases produced by decomposition of the blowing agent within the extruder, a high back pressure is built up in the flowing plastic prior to the instant the plastic flows onto the advancing filamentary core being sheathed. This is accomplished by providing flow restricting grooves, such as the grooves 64—64, on the frustoconical tip 38 of the core tube 28, which frustoconical tip may be fitted snugly within a die opening having a matching configuration.

The grooves 64—64, together with any conical passageway that may exist between the frustoconical tip 38 and the surrounding wall of the aperture 30 in the die, depending upon the longitudinal adjustment of the core tube 28, define the cross-sectional limits of the only passageway through which the mass 14 of the plastic compound can flow. When the core tube 28 has been adjusted so that its frustoconical tip 38 fits snugly within the aperture 30 of the die, the grooves 64—64 provide the sole passageway for the advancing plastic compound. When the core tube is backed slightly away from the die, there is formed a conical passageway between the tip of the core tube and the surrounding wall of the die aperture through which the plastic compound may flow in addition to the passageways provided by the grooves 64—64. Intermediate adjustments in the size of the combined passageway may be made by longitudinally adjusting the core tube.

In practice, operations are begun by placing the tip of the core tube in contact with the die, starting the extruder, and then backing the core tube slightly away from the die until the desired clearance is provided between the tip of the core tube and the surrounding wall of the aperture in the die. Thereafter, the clearance may be varied to change the amount of back pressure, as desired, thereby changing the percentage of occluded gas in the extruded product. The necessary adjustment of this clearance may be made while the apparatus is operating merely by turning the nut 44 in the required direction. The grooves 64—64 are relatively small in cross section. Hence, they are capable of offering high frictional resistance to the flow of the plastic compound. They may be semicircular in cross section in the manner illustrated in Fig. 2, or they may assume other configurations, such as a V-shape.

Using a stock screw having a diameter of about 3¼ inches to extrude a polyethylene compound onto a filamentary core having a diameter ranging from about .016 inch up to about .051 inch being advanced through a die orifice having a minimum diameter ranging from about .030 inch up to about .090 inch, a pressure head of as much as 6,000 pounds per square inch may be built up behind the frustoconical tip of the core tube. This high pressure head makes it possible for the plastic compound within the extruder to be heated to a temperature appreciably above the temperature at which the blowing agent would ordinarily decompose, without producing any large gas cells prior to the time the plastic compound flows past the tip of the core tube 28. The pressure head will be high in the extrusion bore 11, in the chamber 22, and in the tapered passageway 20 which leads from the extrusion bore to this chamber. Then the static pressure will fall as the plastic compound is forced at high velocity through the limited passageway formed around the frustoconical tip of the core tube. When the tip of the core tube terminates in a transversely flat end, such as the end 66 in Fig. 2, which causes the tip of the core tube to appear somewhat blunt, a second zone of high pressure, but of much lower pressure than that in the first high pressure zone, may be created beyond the blunt end of the core tube. The pressure in the flowing compound will remain relatively high until the sheathed core emerges from the exit end of the die, whereupon the sheath may expand rapidly due to release of the pressure confining the gas evolved by decomposition of the blowing agent, and allow the sheath to expand into a cellular form producing the resultant insulated conductor 36.

This arrangement of narrow grooves on the tip of the core tube causes the flowing plastic compound to break up into a plurality of thin streams of equal size uniformly distributed circumferentially of the advancing filamentary core 34. These thin streams converge beyond the tip of the core tube, impinge upon the advancing core, and are shaped by the die into a unitary tubular sheath covering the core. The result of this arrangement is that the sheath is expanded uniformly into its cellular form, the cells in all portions of the expanded sheath being of approximately equal size.

If the flow of the plastic compound were not retarded to build up a high back pressure by this arrangement of the die and the grooved tip of the core tube, and if the flow of the plastic compound were not divided into a plurality of thin streams equally spaced circumferentially of the advancing core, the expansion of the extruded sheath might occur unevenly, with blown cells of a distinctly large size appearing in some portions of the sheath. According to the invention, the blowing agent should decompose within the confines of the extruder, but the high pressure head will prevent the evolved gas from expanding, and the released gas will dissolve in and permeate the plastic compound without creating cells therein until after the pressure has fallen, which condition cannot occur until after the plastic compound has issued from the die. As stated previously, the pressure head may be varied, as desired, while the apparatus is in operation by turning the nut 44 to advance or retract the core tube 28.

As a rule, the stock screw may be any one of three standard sizes, in which the screw may have a diameter of 2 inches, 3¼ inches or 4½ inches. The pitch of the threads on the stock screw may be relatively long so as to cause the plastic compound to be advanced rapidly through the extrusion bore, or the threads may have a shorter pitch which advances the plastic compound less rapidly, but kneads the compound and builds up a high pressure therein. It is evident that the rate of delivery of the extruded product as well as the degree of throttling required of the grooved tip of the core tube, are integrally related to the type of stock screw selected. From about 20 up to about 60 pounds per hour of cellular polyethylene may be delivered by extruders having such stock screws, depending upon the gas content of the expanded sheath.

The rate at which a filamentary core may be advanced through an extruder is determined largely by the wall thickness of the sheath of insulation extruded thereon. Using filamentary cores having diameters ranging from about .016 inch up to about .051 inch to produce cellular polyethylene insulated conductors having outside diameters ranging from about .031 inch up to about .300 inch, the cores may be advanced through the extruders at speeds ranging from about 50 feet per minute to about 1,000 feet per minute.

In the expanded polyethylene sheath the percentage of occluded gas may vary from about 25% up to about 75% by volume. A value of approximately 50% by volume of gas is considered very desirable. When this percentage of gas is trapped within the multiplicity of minute, uniformly distributed cells in the extruded sheath, the dielectric constant of the cellular insulation has a value of about 1.63, in comparison with a value of 2.26 for the dielectric constant of insulation composed of solid polyethylene. The preferred gas content is about 58%, for which the value of the dielectric constant is 1.53.

A polyethylene compound prepared for extrusion may contain about 3% by weight of blowing agent, when the blowing agent is dinitroso pentamethylene tetramine and when the expanded insulation produced contains about 50% by volume of occluded gas. The amount of blowing agent incorporated may be increased up to about 7% by weight, when it is desired to produce a sheath having a larger percentage of gas therein.

A typical core tube which may be used in the extruders described hereinabove may have a diameter of 9/16 inch and the frustoconical tip of the core tube may be provided with eight semicircular grooves each having a radius of about 1/32 inch. In most cases, it is even more desirable to have a larger number of grooves of a smaller radius than those specified in this typical example. The frustoconical tip of the core tube may be described as being cut from a cone having an apex angle which may range from about 15° up to about 60°. The use of smaller angles permits a more delicate adjustment of the rate of flow through the extrusion head, since the core tube may then be adjusted through relatively great distances longitudinally while causing only small changes in the clearance between the tip of the core tube and the surrounding wall of the aperture in the die. The core tube tip 38 in the embodiment shown in Fig. 1 and the complementary aperture 30 in the die 24 are inclined at an angle of about 15°.

The configuration of the aperture extending through the die may be varied to suit the particular core tube selected. In the form illustrated in Fig. 1, the aperture 30 diminishes gradually in cross section from the entrance end to the exit end of the die 24, and the entire length of the aperture has the identical conical configuration as that of the frustoconical tip 38 of the core tube 28. However, satisfactory results also may be obtained by providing only the entrance end of the die with a conical aperture which matches the conical configuration of the frustoconical tip of the core tube, and making the rest of the aperture that extends through the die beyond the tip of the core tube perfectly cylindrical in shape. Such die structure resembles that of conventional extrusion dies. In case the frustoconical tip of the core tube is made with a large angle, the portion of the aperture at the entrance end of the die will have the same large angle, while the rest of the aperture beyond the tip of the core tube may be made with a small angle or it may be perfectly cylindrical.

1st modification

Figure 3:
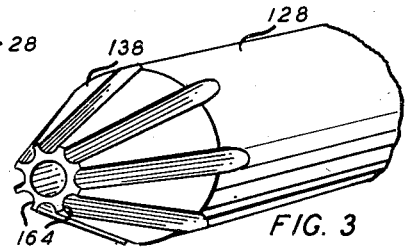
Fig. 3 is a perspective view of a modified form of the portion of the apparatus shown in Fig. 2.

In some instances, such as in the sheathing of filamentary cores of larger diameter, it may be desirable to utilize a core tube having a frustoconical tip which terminates in a transversely flat end of less bluntness. Such a modification is illustrated in Fig. 3, wherein a core tube 128 is provided with an elongated frustoconical tip 138 having a plurality of longitudinal grooves 164—164 equally spaced about its periphery. The frustoconical tip 138 terminates in a transversely flat end 166 of relatively small area in comparison with the transversely flat end 66 of the core tube 28 shown in Fig. 2. The tip 138 may be described as a frustum of a cone having an apex angle of about 60°. The core tube 128 is designed to be used in an extruder identical in construction and in operation with the extruder illustrated in Fig. 1. This modification of the apparatus may be used to perform methods of extruding cellular plastics upon conductors identical with the methods described in detail in the foregoing paragraphs.

2nd modification

Figure 4:
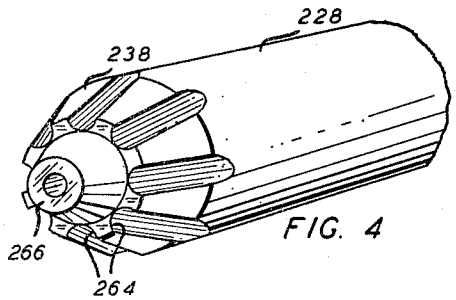
Fig. 4 is a perspective view of another modification of the portion of the apparatus shown in Fig. 2.

A second modification of the core tube is shown in Fig. 4. A core tube 228 is provided with a frustoconical tip 238 having a plurality of longitudinal grooves 264—264 equally spaced circumferentially thereof. The core tube 228 terminates in a transversely flat end 266. However, the grooves 264—264 extend along only about half of the entire length of the frustoconical tip 238. The structure of the frustoconical tip may be viewed as that of two frustoconical sections formed by passing a plane through the midpoint of a single frustoconical section parallel to the base thereof, said sections being taken from a cone having an apex angle of about 60°. The lower section formed in this manner is provided with the grooves 264—264, while the upper section is a truncated cone not having grooves in its periphery, and it terminates at the transversely flat end 266.

The core tube 228 is also designed to be used in an extruder identical in construction and in operation with the extruder illustrated in Fig. 1. The core tube 228 differs from the core tube 28 in that the grooves 264—264 are all about half as long as the grooves 64—64. When the core tube 228 is used to extrude cellular plastic insulation, the flowing plastic compound is divided into a plurality of thin streams as it flows through the grooves 264—264, and beyond these grooves the thin streams merge into a single conical stream as the flowing compound approaches the transversely flat end 266 of the core tube. It is evident that the shorter grooves offer less frictional resistance to the flow of the plastic compound through the extrusion head than do the longer grooves. Hence, this modification of the apparatus would not build up a back pressure quite as large as the back pressure which could be created by the use of the core tube 28. In all other respects, the method of utilizing the core tube 228 is the same as in the cases of the core tubes 28 and 128.

3rd modification

Figure 5:
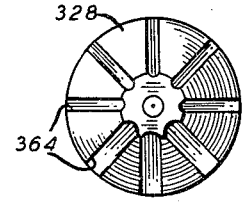
Fig. 5 is an end view of a third modification of the portion of the apparatus illustrated in Fig. 2.

Fig. 5 illustrates a modification of the invention in which compensation is provided for the bend of 90° through which a plastic compound must flow in passing through an extruder of the cross head type, similar to the extruder illustrated in Fig. 1. A frustoconical tip end of a core tube 328 is provided with a plurality of grooves 364—364 equally spaced circumferentially thereof. On one side of this core tube, the grooves 364—364 have a larger cross-section than do the grooves on the opposite side thereof. When the core tube 328 is fitted into the extruder illustrated in Fig. 1, it is oriented so that the side having the larger grooves is more distant from the stock screw than the side having the smaller grooves. Consequently, the portion of the plastic compound that travels the longest path in advancing from the stock screw through the die moves through a quadrant of the chamber of the head having a plurality of passageways of larger cross-sectional area than the passageways in the other quadrants of the chamber.

The passageways of larger cross-sectional area must be on the side of the core tube that is opposite the side on which the stock screw is mounted. Ordinarily the rate of flow of the plastic compound would be lowest in the area most distant from the stock screw, but by enlarging the cross-sectional area of the passageway through this quadrant, the rate of flow in this quadrant is raised. This arrangement may be used to equalize the rates of flow existing in the plastic compound circumferentially of the tip of the core tube. This modification of the apparatus is most effective to correct any lack of concentricity that may occur between the core and the extruded sheath of an insulated conductor. No change need be made in the methods described above when this modification of the apparatus is used to carry out such methods.

In all the modifications shown in Figs. 3, 4 and 5, the position of the core tube tips relative to the complementary apertures in the dies associated therewith may be varied at will, either before the apparatus is put into operation or while it is running, by the proper manipulation of the nut 44. In this manner the desired back pressure may be established and maintained and the finished product will be uniform in character.

What is claimed is:

1. An apparatus for extruding a plastic compound containing a blowing agent which expands the extruded compound into a cellular form, which comprises an extrusion head having a chamber therein, an extrusion die mounted at one end of the chamber, said die having a central aperture provided with a conical entrance portion, a core tube mounted in the chamber in axial alignment with the aperture in the die, one end of the core tube being provided with a frustoconical portion matching the configuration of and projecting into the conical entrance portion of the aperture in the die, the frustoconical portion of the core tube being provided with a plurality of small, longitudinal grooves equally spaced circumferentially thereof and extending the entire length of the frustoconical portion for presenting frictional resistance to the flow of plastic compound therethrough to create a back pressure within the chamber sufficient to prevent the agent from expanding the compound until it issues from the die, means for forcing such a plastic compound through the chamber, the grooves, and the die, and means for adjusting the core tube longitudinally between a position in which the frustoconical tip of the core tube fits snugly against the conical entrance of the die and a position in which a conical passageway is formed therebetween.

2. An apparatus for extruding onto a filamentary conductive core an insulating sheath composed of a plastic compound containing a blowing agent which expands the extruded compound into a cellular form, which comprises an extrusion head having a chamber therein, an extrusion die mounted at one end of the chamber, said die having a central aperture provided with a conical entrance portion, a core tube mounted in the chamber in axial alignment with the aperture in the die for guiding an advancing core toward the die, one end of the core tube being provided with a conical tip matching the configuration of and projecting into the conical entrance portion of the aperture in the die, said conical tip terminating in a transversely flat end to provide a slight enlargement of the flow passageway beyond the end of the core tube and said tip being provided with a plurality of small, longitudinal grooves equally spaced circumferentially thereof and extending the entire length of the tip for presenting frictional resistance to the flow of plastic compound to create a back pressure within the chamber sufficient to prevent the agent from expanding the compound until it issues from the die, means for forcing such a plastic compound through the chamber, the grooves and the die, and means for adjusting the core tube longitudinally between a position in which its conical tip fits snugly against the conical entrance of the die and a position in which said tip is spaced from the wall of the die aperture.

3. An apparatus for extruding onto a filamentary conductive core an insulating sheath composed of a plastic compound containing a blowing agent which expands the extruded compound into a cellular form, which comprises an extrusion head having a chamber therein, an extrusion die mounted at one end of the chamber, said die having a conical central aperture which diminishes gradually in cross-section from the entrance to the exit end thereof, said central aperture having an enlarged, conical entrance portion which diverges at an angle of about 60°, a core tube mounted in the chamber in axial alignment with the aperture in the die for guiding an advancing core toward the die, one end of the core tube being provided with a conical tip matching the configuration of and projecting into the conical entrance portion of the aperture in the die, said conical tip being provided with at least eight small, longitudinal grooves equally spaced circumferentially thereof and extending the entire length of the tip for presenting frictional resistance to the flow of plastic compound to create a back pressure within the chamber sufficient to prevent the agent from expanding the compound until it issues from the die, means for forcing such a plastic compound through the chamber, the grooves and the die, and means for adjusting the core tube longitudinally between a position in which its conical tip fits snugly against the conical entrance of the die and a position in which said tip is spaced from the wall of the die aperture.

4. An apparatus for extruding onto a filamentary conductive core an insulating sheath composed of a plastic compound containing a blowing agent which expands the extruded compound into a cellular form, which comprises an extrusion head having a chamber therein, an extrusion die mounted at one end of the chamber, said die having a cylindrical central aperture provided with a conical entrance portion, a core tube mounted in the chamber in axial alignment with the aperture in the die for guiding an advancing core toward the die, one end of the core tube being provided with a conical tip matching the configuration of and projecting into the conical entrance portion of the aperture in the die, said conical tip terminating in a transversely flat end to provide a slight enlargement of the flow passageway beyond the end of the core tube and said tip being provided with a plurality of small, longitudinal grooves equally spaced circumferentially thereof and extending from about the midpoint of the conical tip to the end of the tip opposite the flat end thereof for presenting frictional resistance to the flow of plastic compound to create a back pressure within the chamber sufficient to prevent the agent from expanding the compound until it issues from the die, means for forcing such a plastic compound through the chamber, the grooves and the die, and means for adjusting the core tube longitudinally between a position in which its conical tip fits snugly against the conical entrance of the die and a position in which said tip is spaced from the wall of the die aperture.

5. An apparatus for forming an insulating sheath composed of a cellular polyethylene onto a filamentary conductive core, which comprises a stock screw rotatably mounted within a cylindrical bore for advancing a plastic compound consisting essentially of polyethylene containing a blowing agent, an extrusion head having a chamber therein mounted transversely across the delivery end of the bore for receiving the plastic advanced by the stock screw, an extrusion die mounted at one end of the chamber, said die having a central aperture provided with a conical entrance portion, a core tube mounted in the chamber in axial alignment with the aperture in the die for guiding an advancing core toward the die, one end of the core tube being provided with a conical tip matching the configuration of and projecting into the conical entrance portion of the aperture in the die, said conical tip being provided with a plurality of small, longitudinal grooves equally spaced circumferentially thereof for presenting frictional resistance to the flow of plastic compound to create a back pressure within the chamber sufficient to prevent the agent from expanding the polyethylene until it issues from the die, the grooves on the side of the core tube away from the stock screw being larger than the grooves on the opposite side thereby compensating for an unbalance of compound flow created by the transverse mounting of the extrusion head, and means for adjusting the core tube longitudinally between a position in which its conical tip fits snugly against the conical entrance of the die and a position in which said tip is spaced from the wall of the die aperture.

6. In an apparatus for forming an insulating sheath composed of a cellular polyethylene onto a filamentary conductive core including a stock screw rotatably mounted within a cylindrical bore for advancing a plastic compound consisting essentially of polyethylene containing a blowing agent, an extrusion head having a chamber therein mounted transversely across the delivery end of the bore for receiving the plastic advanced by the stock screw and an extrusion die mounted at one end of the chamber and having a central aperture provided with a conical entrance portion, the improvement which comprises a core tube mounted in the chamber in axial alignment with the aperture in the die for guiding an advancing core toward the die, one end of the core tube being provided with a conical tip matching the configuration of and projecting into the conical entrance portion of the aperture in the die, said conical tip being provided with a plurality of small, longitudinal grooves equally spaced circumferentially thereof for presenting frictional resistance to the flow of plastic compound to create a back pressure within the chamber sufficient to prevent the agent from expanding the polyethylene until it issues from the die, and means for adjusting the core tube longitudinally between a position in which its conical tip fits snugly against the conical entrance of the die and a position in which said tip is spaced from the wall of the die aperture.

7. An apparatus for extruding an insulating sheath composed of a cellular polyethylene onto a filamentary conductive core, which comprises a stock screw for advancing a plastic compound consisting essentially of polyethylene containing a blowing agent, an extrusion head having a chamber therein mounted transversely across the delivery end of the bore, an extrusion die mounted at one end of the chamber, said die having a central aperture provided with a conical entrance portion which diverges at an angle ranging from about 15° to about 60°, a core tube mounted in the chamber in axial alignment with the die for guiding an advancing core into the die, one end of the core tube being provided with a conical tip matching the configuration of and projecting into the conical entrance portion of the die, and means for adjusting the core tube longitudinally between a position in which its conical tip fits snugly against the conical entrance of the die and a position in which said tip is spaced from the wall of the die aperture, said conical tip being provided with at least eight longitudinal grooves equally spaced circumferentially thereof, said core tube having a diameter of about $9/16$ inch and each of said grooves thereon being semicircular in cross section and having a radius of about $1/32$ inch, whereby sufficient frictional resistance is presented to the flow of the plastic compound to create a back pressure of the order of 6,000 pounds per square inch within the chamber to prevent the blowing agent from expanding the polyethylene until it issues from the die.

8. An apparatus for extruding a plastic compound containing a blowing agent which expands the extruded compound into a cellular form, which comprises an extrusion head having a chamber therein, an extrusion die mounted at one end of the chamber and having a central bore rovided with a conical entrance portion, a core tube mounted in the chamber in axial alignment with and having an end projecting into the conical entrance portion of the bore in the die, said end of the core tube having a conical portion which matches the configuration of the conical entrance portion of said bore and which is provided with a plurality of small, longitudinal grooves spaced circumferentially and extending the entire length thereof, and means for forcing such a plastic compound through the chamber, the grooves and the die, the core tube being so positioned with respect to the die that said grooves afford substantially the only means of passage for the plastic compound to the die and said grooves being of such length and of such restricted cross section that the frictional resistance offered thereby to the flow of plastic compound therethrough creates in the portion of the chamber preceding the die a back pressure sufficient to prevent the blowing agent from expanding the plastic compound until it issues from the die.

9. An apparatus for extruding a plastic compound containing a blowing agent which expands the extruded compound into a cellular form, which comprises an extrusion head having a chamber therein, an extrusion die mounted at one end of the chamber and having a central bore provided with a conical entrance portion, a core tube mounted in the chamber in axial alignment with the aperture of the die, one end of the core tube being provided with a frustoconical portion matching the configuration of and projecting into the conical entrance portion of said bore, the frustoconical portion of the core tube being provided with a plurality of small, longitudinal grooves spaced circumferentially and extending the entire length thereof, and means for forcing such a plastic compound through the chamber, the grooves, and the die, said grooves presenting frictional resistance to the flow of plastic compound therethrough such as to create a back pressure within the chamber sufficient to prevent the agent from expanding the compound until it issues from the die.

10. An apparatus for extruding a plastic compound containing a blowing agent which expands the extruded compound into a cellular form, which comprises an extrusion head having a chamber therein, an extrusion die mounted at one end of the chamber and having a central bore provided with a conical entrance portion, a core tube mounted in the chamber in axial alignment with the aperture in the die, one end of the core tube being provided with a frustoconical portion matching the configuration of and projecting into the conical entrance portion of said bore, the frustoconical portion of the core tube being provided with a plurality of small, longitudinal grooves spaced circumferentially and extending the entire length thereof for presenting such frictional resistance to the flow of plastic compound therethrough as to create a back pressure within the chamber sufficient to prevent the agent from expanding the compound until it issues from the die, means for forcing such a plastic compound through the chamber, the grooves, and the die, and means for moving the core tube longitudinally between a position in which the frustoconical portion thereof abuts the conical entrance portion of the die and a position in which said frustoconical portion is slightly out of contact with said conical entrance portion whereby the back pressure within the chamber may be regulated to control the degree of expansion of the compound.

11. The method of extruding a covering of cellular thermoplastic insulation upon a filamentary conductor, which comprises advancing such a conductor sequentially through an extrusion chamber and an extrusion die, forcing a mixture of thermoplastic compound and a heat-decomposable expanding agent through the chamber and the die around the advancing conductor to produce a concentric sheath on the conductor, heating the mixture in the chamber sufficiently to cause the expanding agent to decompose and generate a gas, splitting the resulting flowing mixture in the chamber into a plurality of fine streams directed toward the advancing conductor so that the mixture impinges upon the conductor at a point just in advance of the die, and restricting the flow of the streams sufficiently to create a back pressure in the flowing mixture of sufficient magnitude to force said gas to dissolve in the thermoplastic compound, thereby preventing premature expansion of the compound before it emerges from the die.

12. The method of extruding a covering of cellular thermoplastic insulation upon a filamentary conductor, which comprises advancing such a conductor sequentially through an extrusion chamber and an extrusion die, forcing a mixture of a thermoplastic compound and a heat-decomposable expanding agent through the chamber and the extrusion die around the advancing conductor to produce a concentric sheath on the conductor, heating the flowing mixture sufficiently to cause the expanding agent to decompose and generate a gas, splitting the flowing mixture in the chamber into a plurality of fine streams equally spaced circumferentially of and directed toward the advancing conductor so that the mixture impinges upon the conductor from all sides just in advance of the die, and restricting the flow of the streams sufficiently to create therein a back pressure of sufficient magnitude to force the gas to dissolve in the flowing compound and to be retained in the compound until it emerges from the die, thereby preventing the gas from expanding the thermoplastic compound prematurely.

References Cited in the file of this patent

UNITED STATES PATENTS

| Number | Name | Date |
|---|---|---|
| 326,021 | Cruickshank | Sept. 8, 1885 |
| 2,156,508 | Minor | May 2, 1939 |
| 2,199,209 | Safford | Apr. 30, 1940 |
| 2,345,086 | Baker et al. | Mar. 28, 1944 |
| 2,354,260 | Haney et al. | July 25, 1944 |
| 2,450,436 | McIntire | Oct. 5, 1948 |
| 2,455,509 | Luaces | Dec. 7, 1948 |
| 2,496,625 | Henning | Feb. 7, 1950 |
| 2,512,506 | Saint Denis | June 20, 1950 |
| 2,537,977 | Dulmage | Jan. 16, 1951 |
| 2,581,769 | Olson | Jan. 8, 1952 |